United States Patent [19]
Jenko et al.

[11] 3,802,654
[45] Apr. 9, 1974

[54] STRAIN RELIEF CABLE ANCHOR

[75] Inventors: William J. Jenko; Lamont C. Stanley, both of Raleigh, N.C.

[73] Assignee: International Business Machines Corporation, Armonk, N.Y.

[22] Filed: Aug. 11, 1972

[21] Appl. No.: 280,019

[52] U.S. Cl............ 248/73, 24/230 B, 24/230 CF, 174/72 A, 248/65, 248/68 R, 248/74 PB, 248/225, 339/104
[51] Int. Cl............................................. F16l 3/08
[58] Field of Search.......... 248/73, 74 PB, 68 R, 65, 248/49, 225; 339/103 R, 103 M, 104; 174/40 CC, 158 R, 72 A; 24/230 F, 230 CF, 230 SC, 230 SL, 230 B; 211/60 R

[56] References Cited
UNITED STATES PATENTS

| | | | |
|---|---|---|---|
| 3,192,499 | 6/1965 | West................................ | 24/230 SC |
| 3,370,815 | 2/1968 | Opperthauser................ | 248/68 R X |
| 3,152,219 | 10/1964 | Murray et al................. | 24/16 PB X |
| 3,508,730 | 4/1970 | Knezo............................ | 248/73 |
| 3,259,347 | 7/1966 | Yates............................ | 248/73 |
| 3,347,505 | 10/1967 | Menser.......................... | 248/68 R |

FOREIGN PATENTS OR APPLICATIONS

| | | | |
|---|---|---|---|
| 1,184,274 | 3/1970 | Great Britain................ | 248/74 PB |
| 796,532 | 6/1958 | Great Britain................ | 174/72 A |

Primary Examiner—Ramon S. Britts
Assistant Examiner—Rodney H. Bonck
Attorney, Agent, or Firm—John B. Frisone

[57] ABSTRACT

An individual cable strain relief anchor which can be mounted or demounted without the use of tools. The anchor includes an integral clamping member which is hand releasable and locks automatically when inserted in a receiving frame member.

3 Claims, 3 Drawing Figures

3,802,654

STRAIN RELIEF CABLE ANCHOR

BACKGROUND OF THE INVENTION

1. Field of the Invention

The invention relates to strain relief cable anchors and more particularly to strain relief cable anchors suitable for anchoring individual cables.

2. Description of the Prior Art

In data processing systems large numbers of cables, each including many conductors, are used to interconnect functional units housed in separate cabinets. A variety of techniques are utilized to connect the conductors in the cables to the circuits within the cabinets. The two most important factors in the selection of a particular connection are the cost of manufacturing the connector system and the ease with which the connectors may be removed and replaced when service of the equipment is required.

Here we are considering connection systems in which a pluggable connector is directly attached to a multi-wire cable and connected directly via the connector to contacts on a circuit board or like member. When this type of connector system is utilized, it is necessary to provide a strain relief anchor since the relatively stiff cable will, if unrestrained, cause the connector to become disconnected or damaged. It has been common practice to provide individual cable clamps or ganged cable clamps for anchoring a number of cables. In each instance, fasteners such as screws have been utilized for attaching the anchors to the cabinet frames. In those instances where multiple cables have been anchored, a single clamping member has been utilized to simultaneously clamp or anchor all of the cables and it has been necessary to release the anchor on all cables in order to release a single cable. In addition, multiple cable anchors have employed a number of fasteners which are awkward to manipulate and require substantial time and effort when maintenance or service is required.

SUMMARY OF THE INVENTION

The invention contemplates a strain relief cable anchor comprising a first member including first means for rigidly attaching said first member to a cable which requires anchoring, second hand activated means having a first normal position and an alternate second position and third retaining means; and a second member including first means for rigidly attaching said second member to a machine frame or the like, second means for coacting with the said third means included in said first member for retaining said first member, and third means for coacting with said second means included in said first member for locking said first member with respect to said second member when said second means is in its said first normal position and permitting removal of said first member from said second member when said second means is moved to its alternate second position.

One object of the invention is to provide an individual cable anchor which is inexpensive to manufacture, durable and reliable in operation.

Another object of the invention is to provide a cable anchor which can be activated and deactivated manually without the use of tools.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
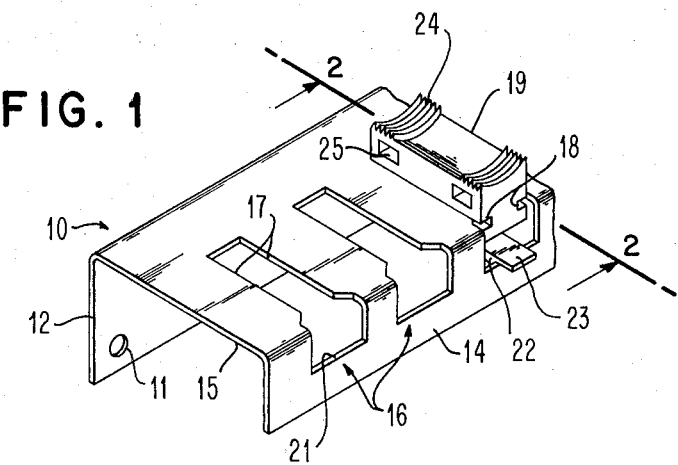
FIG. 1 is a perspective view of a strain relief cable anchor constructed in accordance with the invention.

The cable anchor mechanism illustrated in FIG. 1 includes a support 10 which is arranged to be rigidly attached to the cabinet or frame of a machine by screws or other suitable fastening devices via holes 11 formed in the base 12 of the support 10. The support 10 includes a locking plate 14 connected to the base 12 by a retainer plate 15. Support 10 may be made from a single piece of metal or other suitable material. It may be stamped or moulded in the form illustrated depending on the choice of material selected.

Figure 2:
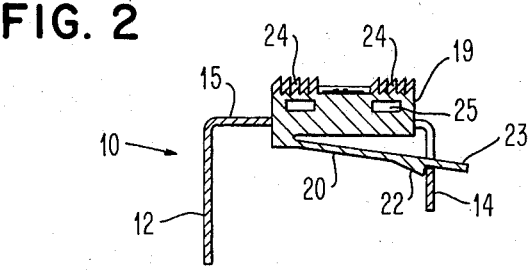
FIG. 2 is a sectional view taken along the line 2—2 of FIG. 1.

A plurality of openings 16, one for each cable which is to be anchored, are formed in the support 10. The opposing walls 17 of opening 16 fit within grooves 18 formed in a removable cable clamp 19 and retain the removable cable clamp 19 in two directions. An integral member 20, best seen in FIG. 2, is biased toward a wall 21 in locking plate 14 and a protrusion 22 in member 20 engages locking plate 14 retaining removable clamp 19 in a third direction thus locking clamp 19 from movement with respect to support 10 when the clamp 19 occupies the position illustrated best in FIGS. 1 and 2. An extension 23 of member 20 extends beyond locking plate 14 and when deflected, by finger pressure, toward the body of clamp 19 will remove the restraint in the third direction thus permitting the withdrawal of the clamp 19 from the support 10.

Figure 3:
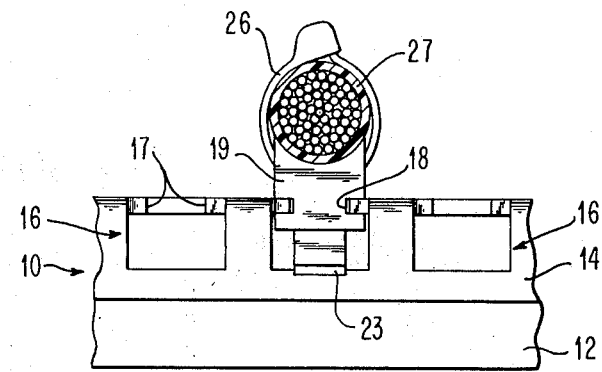
FIG. 3 is a front elevation of the strain relief cable anchor illustrated in FIG. 1.

Clamp 19 is provided with two groups of serrations 24 and a pair of spaced strap holes 25 which in cooperation with straps 26, FIG. 3, rigidly attach clamp 19 to a cable 27 which is to be anchored. Straps 26 may be selected from a variety of commercially available straps. The serrations 24 may be modified to accommodate forces in specific directions and may be shaped to match the cable shape to insure a better grip on the cable.

While the invention has been particularly shown and described with reference to a preferred embodiment thereof, it will be understood by those skilled in the art that various changes in form and details may be made therein without departing from the spirit and scope of the invention.

What is claimed is:

1. A strain relief cable anchor for securing at least one cable to a device to isolate cable strains from the electrical connections at the termination of the cable and the device comprising:
   a first member including;
      first means for rigidly attaching said first member to the cable to be anchored;
      second hand movable means having a first normal position and an alternate second position; and
      third retaining means comprising a groove formed on each of two opposite sides of the said first member;

a second member including;
fourth means comprising a substantially "L" shaped member having an opening formed in the two surfaces defining the substantially "L" shaped member, said opening being defined by three edges in each of the two surfaces defining the substantially "L" shaped member, two of said edges opposing each other in one of said surfaces and being spaced from each other and adapted to engage the grooves formed in said third retaining means to retain said first member in at least two directions, and the other of said surfaces forming the substantially "L" shaped member, adjacent one of the edges defining the opening therein, is adapted to engage said second hand movable means when it resides in its first normal position to retain said first member in a third direction; and
fifth means for rigidly attaching said second member to the device which requires connection to the cable.

2. A strain relief cable anchor as set forth in claim 1 in which said first member is a unitary structure.

3. A strain relief cable anchor as set forth in claim 2 in which said second hand movable means having a first normal position and an alternate second position is a resilient protrusion from said first member biased to the said first normal position where it engages the said other surface of the substantially "L" shaped member to thereby restrict relative movement in one direction when operatively positioned and so engaged.

* * * * *